Oct. 15, 1940.  A. I. EDDY  2,218,193
PRIMARY BATTERY
Filed Aug. 20, 1936  2 Sheets-Sheet 1
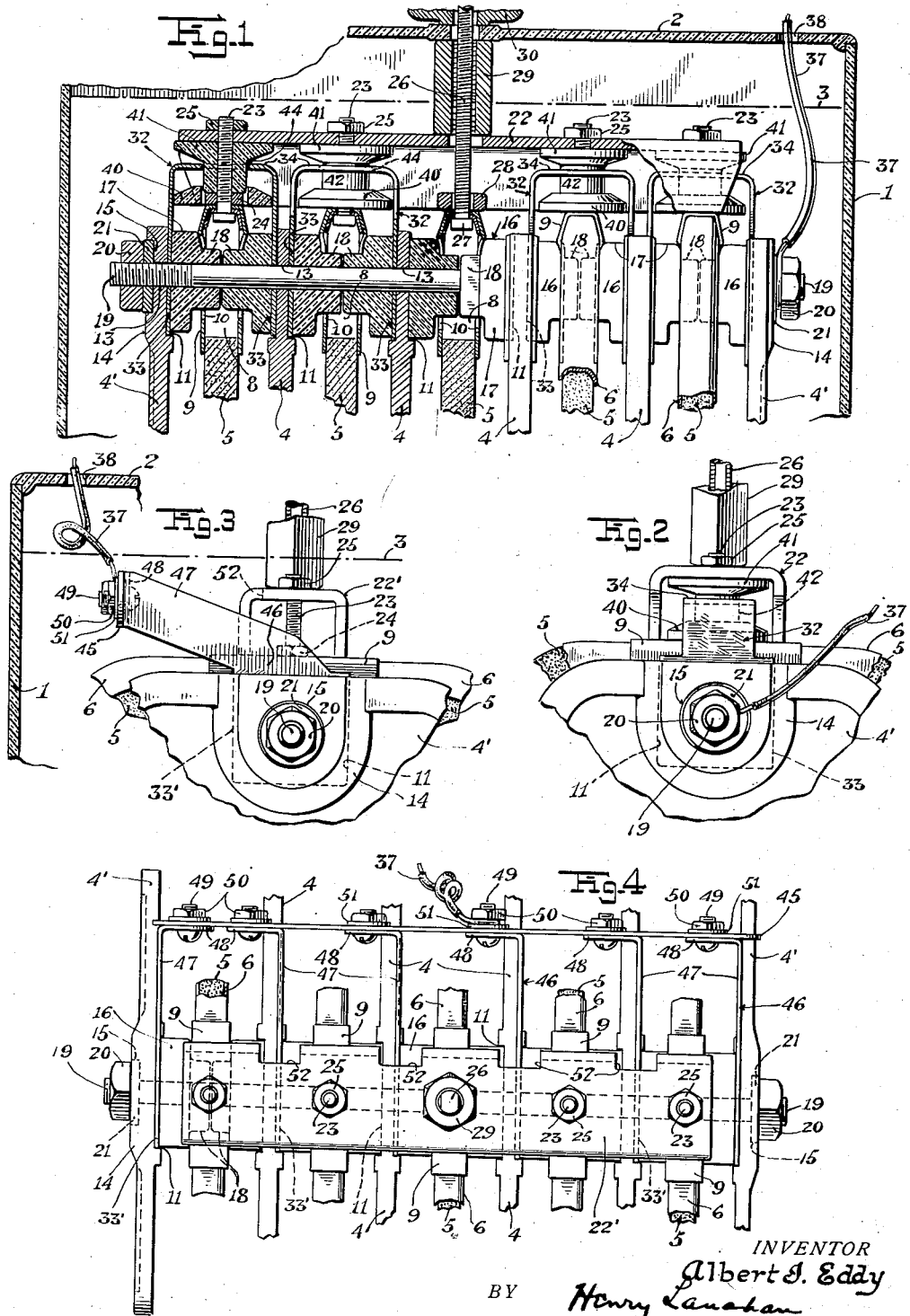
INVENTOR
Albert J. Eddy
BY Henry Lanahan
ATTORNEY Oct. 15, 1940.   A. I. EDDY   2,218,193
PRIMARY BATTERY
Filed Aug. 20, 1936   2 Sheets-Sheet 2
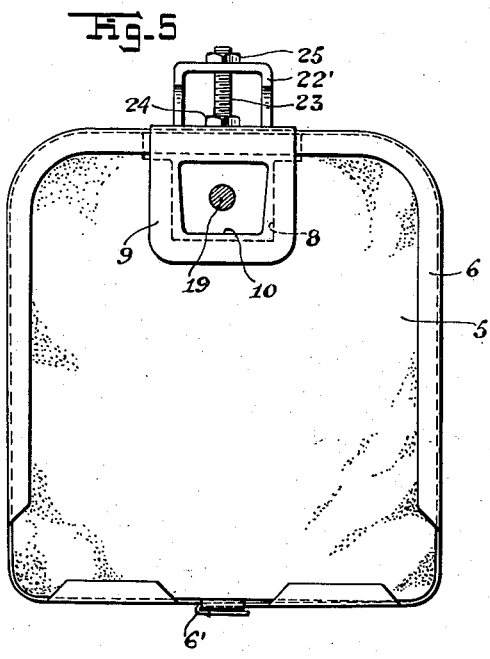
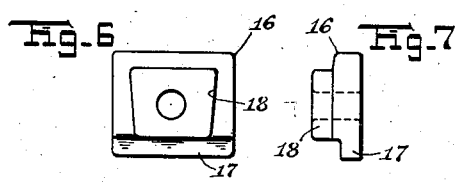
INVENTOR
Albert I. Eddy
BY
ATTORNEY

Patented Oct. 15, 1940

2,218,193

UNITED STATES PATENT OFFICE 2,218,193

PRIMARY BATTERY

Albert I. Eddy, West Caldwell, N. J., assignor to Thomas A. Edison, Incorporated, West Orange, N. J., a corporation of New Jersey Application August 20, 1936, Serial No. 96,909

6 Claims. (Cl. 136—115)

The present invention, which in some aspects is an improvement on that disclosed in my copending application Serial No. 61,738 filed January 31, 1936 entitled Primary battery now Patent 2,175,885 granted Oct. 10, 1939, relates to primary batteries and more particularly to those of the type in which the positive and negative electrode elements are disposed in alternate relation and assembled into a unitary structure which is supported in the cell container or jar with the electrode elements thereof disposed in a suitable electrolyte. In common forms of primary batteries of this type, the positive elements consist of zinc and are in the form of plates or cylinders, and the negative elements consist principally of oxide of copper or other suitable depolarizing material, which is either properly molded and agglomerated in the form of plates or cylinders or is packed within suitable perforated containers; and while not limited thereto, my invention is especially designed for embodiment in primary battery cells the negative electrode elements of which comprise molded and agglomerated plates of cupric oxide and are each maintained between and in properly spaced and insulated relation to two positive electrode elements in the form of zinc plates. By the term positive elements, as herein used, I mean the elements or plates from which current flows through the electrolyte to the other or negative elements.

In primary battery cells such as last described, it has been common practice to connect the negative plates to and support the same from a single suspension member attached to the cover of the cell container and serving as the negative electrode element terminal or positive pole of the cell, and to support the positive plates from the negative elements by means comprising a long threaded rod extending through upper portions of both the positive and negative plates and also through suitable insulating and spacing members or blocks disposed between the adjacent positive and negative plates, such means also comprising nuts which were threaded on such rod and turned up tightly against the respective positive plates so as to secure all of said parts firmly together and provide a rigid unitary electrode element assembly. Heretofore in that form of cell having such an electrode element assembly, the threaded connecting and supporting rod and nuts referred to have also been relied upon to electrically connect the positive plates and such rod has served as the positive electrode element terminal of the cell.

While the construction just described is quite satisfactory in a primary battery cell employing not more than three positive zinc elements or plates, extremely unsatisfactory results are obtained if this construction is employed in a cell where the number of positive zinc plates is increased beyond three with a corresponding increase in the number of negative or copper oxide plates, because of the practical impossibility of obtaining good electrical contact between the electrode element connecting rod and each of the positive plates and the fact that such electrical contact, in the case of one or more of the positive plates, becomes increasingly impaired as discharge of the cell progresses. Accordingly, in such a cell the positive zinc plates are very unevenly consumed upon discharge of the cell and it is likely that one or more of such elements will become entirely inoperative long before the expiration of the rated life of the cell.

The principal object of my invention is to provide in a primary battery cell, a novel construction which is in some respects an improvement over that described and claimed in my said copending application Serial No. 61,738, whereby, regardless of the number of electrode elements or plates embodied in the cell, the positive elements will be and remain substantially equally active and the consumption thereof will progress evenly or uniformly during the discharging of the cell to a state of substantially complete exhaustion.

Another object of my invention is to provide for battery cells of the character above described an electrode element assembly embodying a novel construction for effectively maintaining the positive elements in good electrical connection with each other and with the negative pole of the cell until such elements are substantially entirely consumed.

A further object of my invention is to provide for battery cells of the character described an electrode element assembly whereby the above-mentioned desirable results are obtainable without the necessity of providing the positive elements or plates with extensions or otherwise making any change or alteration in the standard form of such plates.

A still further object of my invention is to provide an improved electrode element assembly whereby the desirable results above set forth are obtainable, which is of compact construction and neat in appearance and wherein the usual connecting and securing bolt or rod for the positive and negative plates or elements, as has heretofore been customary, serves as the positive electrode element terminal of the cell.

Other objects and features of my invention will be hereinafter more specifically described and claimed.

In order that my invention may be more clearly understood, attention is directed to the drawings which accompany and form part of this specification and in which:

Figure 1 is a fragmentary part-sectional view of a primary cell provided with one form of my improved electrode element assembly, such assembly being shown in side elevation with parts thereof in section;

Fig. 2 is a view in side elevation of the electrode element assembly looking from the right in Fig. 1;

Fig. 3 is a fragmentary part-sectional view of a primary battery cell provided with a modified form of electrode element assembly in accordance with my invention, such assembly being shown in end elevation;

Fig. 4 is a top plan view, partly broken away, of the electrode element assembly of the cell shown in Fig. 3;

Fig. 5 is a view in side elevation of one of the negative plates of the electrode element assembly shown in Figs. 3 and 4, certain parts associated with said plate in the assembly also being shown;

Fig. 6 is an elevational view of one of the blocks employed in both of the forms of electrode element assembly shown in Figs. 1 and 4, for spacing and insulating the positive plates from the negative plates; and Fig. 7 is an elevational view looking from the right in Fig. 6.

Referring to Figs. 1 and 2 of the drawings, the battery cell shown therein comprises a jar or container 1, preferably formed of glass, having a cover 2 of suitable insulating material such as porcelain, and an electrode element assembly suspended from the cover 2 and with the electrode elements or plates thereof immersed in a suitable electrolyte which partially fills the container. The electrolyte is maintained in the container 1 at a level, indicated at 3, somewhat above the tops of the electrode elements. Where the negative elements are formed of oxide of copper and the positive elements are of zinc, as in the battery cell illustrated, such electrolyte preferably consists of a substantially 20% solution of caustic potash.

The battery element assembly as shown comprises a plurality of flat and substantially rectangular positive plates 4 and 4' of zinc, and a plurality of flat and substantially rectangular negative plates 5 formed of highly compressed and agglomerated copper oxide. The positive and negative plates are disposed side by side in opposed and alternate relation, the number of positive plates being greater by one than the number of negative plates whereby each of the end or outer elements of the assembly is a zinc positive plate, and the arrangement being such that each of said end or outer elements is one of the two zinc plates 4' present in the assembly.

In the operation of the cell, the consumable active zinc elements or plates are attacked more vigorously at the edges thereof than at their intermediate portions. Accordingly in order that the initial effective surface areas of the zinc plates may be maintained until the cell reaches a state of almost complete exhaustion, each of such plates, as shown, is provided with thickened edge portions. The intermediate zinc plates 4 are of corresponding thicknesses and are otherwise identical in construction; but the end zinc plates 4' are not much more than half as thick as the intermediate plates 4 because each of them is opposed to and coacts with but a single negative plate and is therefore consumed much less rapidly. Also, as will presently appear, the end plates 4' differ somewhat at their upper end portions, from the intermediate zinc plates 4.

The electrode element assembly shown in Fig. 1, comprises six positive zinc plates and five negative copper oxide plates, but it is to be understood that my invention is not limited to structures having any particular number of electrode elements and is subject to a wide variation in this respect. The positive and negative plates are rigidly secured together in properly spaced and substantially parallel relation and with each positive plate insulated from each negative plate in a manner presently to be described. Each of the negative copper oxide plates 5 is closely embraced at its edge portions by a conductive frame 6 which may be formed either of copper or suitable sheet metal coated with copper. Each frame 6 consists of a channel-shaped member which is preferably of the form shown in Fig. 5 and is applied to one of the plates 5 and bent about the corners thereof, the ends of such frame being suitably secured together preferably beneath the lower edge of the plate as shown at 6' in said figure.

Each negative plate 5, as is customary, is provided centrally of its upper end portion with a notch or recess 8, and applied to and embracing such recessed portion of the plate and the corresponding portion of the frame 6 for the plate is a saddle or channel member 9 formed of springy conductive material, preferably copper-plated sheet iron or steel. The side walls or flanges of the saddle 9 have aligned openings 10 which are somewhat smaller than but register with the notch 8 of the plate.

Each intermediate zinc plate 4 is provided on the opposite faces thereof and centrally of its upper end portion with similar rectangular depressions or recesses 11 extending downwardly from the upper edge of the plate, and each end or outer zinc plate 4' is provided on its inner face only with a corresponding depression or recess. The plates 4 and 4' are also respectively provided substantially centrally of the depressions 11, with circular openings 13. Each end plate 4' of the assembly is provided on its outer face and centrally of its upper end portion with a boss 14 having a circular recess or counter-sink 15 concentric with the opening 13 therein.

In order to space and insulate the positive plates from the negative plates, a plurality of insulating blocks 16, preferably formed of porcelain, are provided, each of said blocks 16 comprising a main portion 17 and a reduced portion 18. The main portions 17 of the blocks 16 are respectively seated in the depressions 11 of the plates 4 and 4', and the reduced portions 18 of the blocks extend into the notches 8 of the respective adjacent negative plates 5 through the openings 10 in the corresponding saddle 9. The positive and negative plates and the intervening spacing and insulating blocks 16 are mechanically rigidly secured together in the relation shown by a rod 19 extending through the openings 13 in plates 4 and 4' and through corresponding openings provided in the insulating blocks, and nuts 20 threaded on the ends of such rod. Washers 21 are disposed on rod 19 and respectively seated in the recesses 15 of the outer plates 4'. In securing the electrode elements and insulating blocks together, as described, nuts 20 are turned up tightly against washers 21 whereupon the shoulders formed between the portions 17 and 18 of the insulating blocks engage the sides of saddles 9 about the openings 10 therein and force them firmly against the respective adjacent plates 5. The rod 19, nuts 20 and washers 21 are formed of conductive material, such as copper or steel, which is amalgamated so as to be inactive and non-consumable in the operation of the cell.

The negative plates 5 are connected together, both mechanically and electrically, and the entire electrode element assembly is supported from the cover 2 of the container or jar 1 with the electrode elements disposed in the electrolyte by suitable means, the illustrated form of which will now be described. Reference character 22 represents a heavy bridging member which preferably has the form of an inverted U in transverse cross section and which extends above and transversely of the negative plates 5 with its lower edges engaging the saddles 9 of all of said plates. The plates 5 are rigidly secured to the member 22 and also electrically connected therewith by bolts 23 having their heads disposed in the channels of the respective frames 6 and their threaded shanks respectively extending through sets of aligned openings provided in the bases of members 6, 9 and 22, and by nuts 24 and 25 turned down on said bolts into tight engagement with the frames 6 and bridging member 22 respectively. The plates 5 are also in electrical connection with member 22 by reason of the engagement of the latter with the plate saddles 9. A long threaded bolt 26 has its head 27 disposed in the channel of the frame 6 for the central negative plate 5 and extends upwardly through aligned openings provided in the said frame 6, the corresponding saddle 9, the bridging member 22 and the cell-container cover 2. Nuts 28 and 29 are turned down on the bolt 26 tightly into engagement respectively with the saddle 9 of the central negative plate and the bridging member 22. A wing nut 30 threaded onto bolt 26 above the cover 2 is turned down so as to bring the upper end of nut 29 into firm engagement with the lower surface of the cover. It is apparent that the entire electrode element assembly is thus supported and suspended from the cover 2 at a single point and that the weight of the assembly is transmitted to the bolt 26 by the frame 6 which embraces the central negative plate 5. All of the parts 22, 23, 24, 25, 26, 28, 29 and 30 are formed of conductive metal, preferably copper or copper plated iron or steel, which is non-consumable in the operation of the cell. The bolt 26 constitutes the negative electrode element terminal and the positive pole of the cell.

Heretofore in primary battery cells of the general construction and arrangement above described, conductive threaded rods or bolts (corresponding to the rod 19 of the cell shown in Figs. 1 and 2) extending through the positive and negative plates and the intervening spacing and insulating blocks for mechanically securing such parts together, have also served as terminals for the positive plates, and nuts mounted on such rods and turned up thereon against the respective positive plates have been relied upon to electrically connect said positive plates with the respective rods and through such rods with each other. However, for reasons hereinbefore set forth, it is quite impracticable in a primary battery cell of this character and wherein there are more than three positive plates to rely upon a structure such as that just described, as the means for electrically connecting the positive plates with each other and with the common terminal for such plates. Accordingly as the principal feature of my invention, I have provided an improved construction for such a cell whereby a member constituting the common terminal for the positive plates, (which member may, in accordance with my invention, either be the aforementioned securing rod or bolt or separate and distinct therefrom) will be maintained in good electrical connection with each of the positive plates, thereby insuring uniform consumption of the latter during discharge of the cell and until the latter reaches a state of substantially complete exhaustion.

In that embodiment of my invention shown in Figs. 1 and 2, the securing rod or bolt 19 constitutes the common terminal for the positive plates and the negative pole of the cell, and the means for maintaining the positive plates in good electrical connection with each other and with such common terminal or pole comprises, in addition to the rod 19 itself, the nuts 20 and washers 21 on the ends of said bolt, a plurality of inverted U-shaped members 32, which are of high electrical conductivity but are non-consumable and inactive in the operation of the cell, such members preferably being formed of thin amalgamated sheet copper. The parts 19, 20 and 21 are likewise conductive but non-consumable and inactive, being also preferably made of amalgamated copper. The lower end portions 33 of the legs of the members 32 are rectangular and slightly less in size than the rectangular recesses or depressions 11 in the zinc plates 4 and 4'. The said members 32 are respectively directly associated with the adjacent pairs of zinc plates 4 and 4' with the exception of the pair located centrally of the electrode element assembly. The end portions 33 of each of the members 32 respectively engage the recesses 11 in the opposed faces of the two zinc plates with which such member is associated, the said portions 33 having suitable openings through which the rod 19 loosely extends. Therefore, when the nuts 20 are turned up tightly on the rod 19 to thereby rigidly secure the parts of the electrode element assembly together, the rectangular end portions 33 of members 32 will be firmly pressed against and held in close contact with the bottom surfaces of the respective depressions 11 in the zinc plates engaged thereby. Each of the members 32 will then serve to maintain good electrical connection between the two zinc plates with which it is associated throughout the life of the cell. In this connection, it is to be noted that by reason of the close firm contact maintained between the end portions 33 of members 32 and the respective adjacent surface portions of the zinc plates, such plate portions will not be consumed or eaten away to any material extent during discharge of the cell.

The legs of each of the members 32 extend upwardly from their end portions 33 beyond the upper edges or confines of the positive and negative plates and terminate within the channel of the bridging element 22 at some distance below the top of the latter where they are joined by the base 34 of said member. The legs and base 34 of each member 32 are preferably, although not necessarily, formed integrally, and said base and the upper portions of said legs, as shown in Fig. 2, are of a width which is considerably less than that of the lower leg portions 33 and also less than the distance between the side flanges of bridging member 22 so as to be spaced from such flanges. Each of the outer zinc plates 4' will be maintained in good electrical connection with rod 19 throughout the useful life of the cell by the washer 21 seated in the recess 15 of such plate and the cooperating nut 20, for said washer is held so tightly against its seat that there will be little likelihood of the underlying portion of the plate being consumed or eaten away to any appreciable extent during discharge of the cell. The construction above described insures the maintenance of an exceedingly effective electrical connection being maintained throughout the life of the cell between the positive zinc plates of each of the two groups of such plates at either side of the central negative plate 5, and also between each of said groups of positive plates and the securing rod 19, which rod in this modification of my invention, constitutes the terminal for the positive electrode elements and the negative pole of the cell. Therefore during discharge of the cell all of the zinc positive plates will be consumed at substantially uniform rates.

Connection of the rod 19, i. e. the negative pole of the cell, to the circuit which the cell serves may be effected by a conductor 37 which has one end secured between the nut 20 on one end of rod 19 and the adjacent washer 21 and which extends upwardly through an opening 38 provided in the cover 2.

To prevent any possibility of short-circuits being established between the base 34 or the upper leg portions of any of the members 32 and the adjacent parts 9, 23, 24 and 22, which are in electrical connection with the negative plates, there is preferably associated with each of said members 32, a two-part spool-like member formed of porcelain or other suitable insulating material. One of the parts of each of such spool-like members is preferably in the form of an annular flange section 40 which is disposed between the legs of one of the members 32 and rests on the saddle 9 of the intermediate negative plate 5, while the other part comprises an end flange section 41 and a cylindrical barrel or hub section 42. The last-mentioned part of each of these spool-like members has an axial opening through which the respective bolt 23 extends, and such part is positioned with its flange section 41 disposed between the bridging member 22 and the base 34 of the respective member 32 and with its hub section 42 extending through an opening 44 provided in said base 34 and into the opening of the section 40 so as to engage the nut 24 on the said bolt 23.

In that embodiment of my invention above described and shown in Figs. 1 and 2, positive zinc plates of standard form may be and preferably are employed, all parts formed of porcelain or other readily frangible material are well protected, and the entire structure may be made up in a neat and compact form with a minimum of unsightly or exposed protruding parts.

Figs. 3 and 4 illustrate a primary battery cell structure which is similar in all respects to that shown in Figs. 1 and 2, except for the negative pole or common terminal for the positive plates and the means employed for electrically connecting the positive plates with each other and with such terminal, and also except for a slight modification in the bridging member to which the negative plates are secured. In the drawings like parts of the two forms of cell structures shown, are designated by the same reference characters. In that embodiment of my invention shown in Figs. 3 and 4, the positive electrode element terminal or negative pole of the cell consists of a member 45 which is separate and distinct from the securing rod 19 for the positive and negative plates and intervening insulating members 16. This member 45 is preferably in the form of a long thin bar of good conductive material, such as copper, and is amalgamated to render the same inactive in the operation of the cell. The bar 45 is connected with each of the positive zinc plates 4 and 4' by means comprising a plurality of members 46 which correspond in number to the positive plates and which, as in the case of said bar, are thin and formed of good conductive material, such as sheet copper, and are amalgamated to render the same inactive in the operation of the cell. The members 46 are provided with rectangular end portions 33' corresponding to the end portions 33 of the members 32 in the structure shown in Figs. 1 and 2. The portions 33' of the said members 46 are respectively disposed in and securely held against the bottoms of one recess 11 in each of the positive plates 4 and 4', in the same manner and with the same effect as the portions 33 of members 32 are disposed and held in depressions 11 of the positive plates in the case of the structure shown in Figs. 1 and 2. The members 46 also comprise inclined portions 47 which extend upwardly from the portions 33' and which have outer right angularly bent end portions 48, the latter being respectively rigidly secured to the bar or terminal member 45 by short bolts 49 and nuts 50 threaded on the latter. To prevent the nuts 50 from loosening, washers 51 are preferably disposed on the bolts between such nuts and the bar 45. In this form of my invention the conductor 37 for connecting the positive electrode element terminal with the circuit which the cell is to serve, has one end thereof secured between the nut 50 and washer 51 associated with one of the bolts 49.

The bridging member 22' of the structure shown in Figs. 3 and 4, is similar in all respects to the member 22 shown in Figs. 1 and 2 except that it is provided with a number of cut-outs or notches 52 for respectively accommodating the upwardly extending and inclined portions 47 of some of the members 46.

The structure shown in Figs. 3 and 4, is just as efficacious in maintaining the positive zinc plates in good electrical connection with the negative pole of the cell as is that form of my invention shown in Figs. 1 and 2 and, while not so compact and neat in appearance as the latter, is, under some circumstances, preferable thereto because of its simple and economic construction.

Having now described my invention, I claim:

1. In a primary battery element assembly including a plurality of alternately arranged positive and negative plates and means firmly securing said plates together in spaced relation and with each positive plate insulated from each adjacent negative plate; the combination of means for mechanically and electrically connecting said negative plates comprising a conductive channel member extending transversely over the negative plates with the edges of its flanges adjacent the latter, and means for electrically connecting all of the positive plates, said last means including a plurality of U-shaped members formed of conductive but inactive non-consumable material for effecting such electrical connection of some at least of said position plates, portions of the legs of each of said U-shaped members being respectively held by said securing means in engagement with surface portions of a pair of adjacent positive plates, the base and adjacent leg portions of each of said U-shaped members being disposed in the channel of but spaced at all points from said channel member.

2. In a primary battery element assembly including a plurality of alternately arranged positive and negative plates and means firmly securing said plates together in spaced relation and with each positive plate insulated from each adjacent negative plate; the combination of means for mechanically and electrically connecting said negative plates comprising a conductive channel member extending transversely over the negative plates with the edges of its flanges adjacent the latter, means for electrically connecting all of the positive plates, said last means including a plurality of U-shaped members formed of conductive but inactive non-consumable material for effecting such electrical connection of some at least of said positive plates, portions of the legs of each of said U-shaped members being respectively held by said securing means in engagement with surface portions of a pair of adjacent positive plates, the base and adjacent leg portions of each of said U-shaped members being disposed in the channel of said channel member, and an insulator member associated with the base of each of said U-shaped members for maintaining the latter properly spaced and insulated from the means for mechanically and electrically connecting the negative plates.

3. In a primary battery element assembly including a plurality of alternately arranged positive and negative plates and means securing said plates together in spaced relation and with each positive plate insulated from each adjacent negative plate; the combination of means for mechanically and electrically connecting said negative plates comprising a conductive channel member extending transversely over the negative plates with the edges of its side flanges adjacent the latter and a plurality of rods respectively extending between the negative plates and the base of said channel member and within the channel of the latter, means for electrically connecting all of the positive plates, said last named means including a plurality of U-shaped members formed of conductive but inactive and non-consumable material for effecting such electrical connection of at least some of said positive plates, each of said U-shaped members having portions of the legs thereof respectively held by said securing means in engagement with surface portions of a pair of the adjacent positive plates and having its base and adjacent leg portions disposed in the channel of said channel member, the said rods respectively extending through the bases of said U-shaped members, and insulator members through which said rods respectively extend and which act to maintain said U-shaped members properly spaced and insulated from said channel member and from the respective adjacent rods and negative plates.

4. In a primary battery element assembly including a plurality of alternately arranged positive and negative plates and means comprising a securing rod of conductive material securing said plates together in spaced relation and with each positive plate insulated from each adjacent negative plate, each of the outermost plates of the assembly being a positive plate and being grounded to said securing rod and the positive plates in the assembly being in excess of three and comprising two groups in which the said two outermost plates of the assembly are respectively included; the combination of means for mechanically and electrically connecting said negative plates comprising a channel member extending transversely over the negative plates and having the edges of its side flanges adjacent the latter and a plurality of connecting rods respectively extending between the negative plates and the base of said channel member and within the channel of the latter, means for electrically connecting the positive plates in each of said groups comprising a plurality of U-shaped conductive but inactive and non-consumable members for each such group respectively associated with pairs of adjacent positive plates in that group, the legs of each of said U-shaped members having portions which are respectively held by said securing means in engagement with surface portions of the positive plates with which such member is associated, the bases of said U-shaped members being disposed in the channel of said channel member and having openings through which said connecting rods respectively extend, and two-part spool-like insulators having their hubs or barrels respectively extending through the openings in the bases of said U-shaped members, the rods connecting said channel member and the negative plates intermediate each of the pairs of adjacent positive plates in each of said groups respectively extending through the two-part insulators which are associated with the corresponding U-shaped members.

5. In a primary battery element assembly having a plurality of zinc plates and a plurality of copper oxide plates, said zinc plates being consumable in the discharging operation of the battery for which the assembly is designed, and means mechanically securing said plates together in spaced relation and with each zinc plate insulated from all the copper oxide plates; means electrically connecting said zinc plates including a plurality of conductive but inactive non-consumable flat portions gripped by said securing means firmly in direct close surface contact with portions of said zinc plates respectively which are within the main active areas of such plates and which though consumable will remain substantially intact, in the normal use of the battery, until the positive plates are substantially entirely consumed, said flat portions having extensions respectively projecting therefrom outwardly of the main active areas of said plates, said connecting means also including means separate and distinct from said securing means electrically connecting the extension of each of said flat portions to the extension of at least another of said flat portions.

6. In a primary battery element assembly including a plurality of positive and negative elements, said positive elements being consumable in the discharging operation of a battery for which the assembly is designed, and means mechanically securing said elements together in spaced relation and with each positive element insulated from all the negative elements; the combination of a plurality of conductive but inactive non-consumable elements having portions gripped by said securing means firmly in direct, close surface contact with portions of said positive elements respectively which are within the main active areas of such elements and which though consumable will remain substantially intact, in the normal use of the battery, until the positive elements are substantially entirely consumed, said inactive elements having extensions projecting from the said portions thereof outwardly beyond the confines of said positive elements, and a single member of conductive material secured to all of said extensions at points beyond the confines of said positive elements.

ALBERT I. EDDY.

CERTIFICATE OF CORRECTION.

Patent No. 2,218,193.                                              October 15, 1940.

ALBERT I. EDDY.

It is hereby certified that error appears in the printed specification of the above numbered patent requiring correction as follows: Page 4, second column, line 65, claim 1, for the word "position" read --positive--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.